United States Patent
Noronha et al.

(10) Patent No.: US 9,218,314 B2
(45) Date of Patent: Dec. 22, 2015

(54) BOOSTING REMOTE DIRECT MEMORY ACCESS PERFORMANCE USING CRYPTOGRAPHIC HASH BASED APPROACH

(71) Applicant: International Business Machines Corporation, Armonk, NY (US)

(72) Inventors: Ranjit M. Noronha, Mumbai (IN); Sandeep R. Patil, Pune (IN); Ajay K. Singh, Wakad (IN); Kailas S. Zadbuke, Pune (IN)

(73) Assignee: International Business Machines Corporation, Armonk, NY (US)

( * ) Notice: Subject to any disclaimer, the term of this patent is extended or adjusted under 35 U.S.C. 154(b) by 357 days.

(21) Appl. No.: 13/756,656

(22) Filed: Feb. 1, 2013

(65) Prior Publication Data

US 2014/0222945 A1    Aug. 7, 2014

(51) Int. Cl.
  *G06F 15/167* (2006.01)
  *G06F 15/173* (2006.01)
  *G06F 12/02* (2006.01)

(52) U.S. Cl.
  CPC .......... *G06F 15/17331* (2013.01); *G06F 12/02* (2013.01)

(58) Field of Classification Search
  CPC . G06F 15/17331; G06F 15/167; G06F 21/64; G06F 12/02
  USPC ................................................ 709/203, 212
  See application file for complete search history.

(56) References Cited

U.S. PATENT DOCUMENTS

| | | | |
|---|---|---|---|
| 6,473,845 B1 * | 10/2002 | Hornung et al. | 711/165 |
| 7,342,934 B1 * | 3/2008 | Mott et al. | 370/412 |
| 7,592,930 B1 * | 9/2009 | Ager et al. | 341/50 |
| 7,747,584 B1 | 6/2010 | Jernigan, IV et al. | |
| 7,779,178 B2 | 8/2010 | Sarangam et al. | |
| 8,019,826 B2 | 9/2011 | Dreier | |
| 8,099,571 B1 * | 1/2012 | Driscoll et al. | 711/162 |

(Continued)

FOREIGN PATENT DOCUMENTS

| | | |
|---|---|---|
| EP | 2038763 A2 | 3/2009 |
| JP | 2008108039 A | 5/2005 |

(Continued)

OTHER PUBLICATIONS

International Search Report and Written Opinion dated Apr. 1, 2014, International Application No. PCT/IB2014/058116, 7 pages.

(Continued)

*Primary Examiner* — Duyen Doan
(74) *Attorney, Agent, or Firm* — Stephen R. Tkacs; Stephen J. Walder, Jr.; Randall J. Bluestone

(57) ABSTRACT

A mechanism is provided in a data processing system for performing a remote direct memory access operation. Responsive to receiving in a network interface controller a hash value of data to be copied from a source address in a source node to a destination address in a destination node in the remote direct memory access operation, the network interface controller performs a lookup operation in a translation protection table in the network interface controller to match the hash value to a hash value for data existing in memory of the destination node. Responsive to the network interface controller finding a match in the translation protection table, the network interface controller completes the remote direct memory access operation without transferring the data from the source node to the destination node.

22 Claims, 10 Drawing Sheets

(56) References Cited

U.S. PATENT DOCUMENTS

| | | | |
|---|---|---|---|
| 2008/0002578 A1* | 1/2008 | Coffman et al. | 370/230 |
| 2008/0005141 A1 | 1/2008 | Zheng et al. | |
| 2009/0157802 A1* | 6/2009 | Kang et al. | 709/203 |
| 2010/0031000 A1* | 2/2010 | Flynn et al. | 711/216 |
| 2010/0082766 A1* | 4/2010 | Dreier | 709/216 |
| 2011/0022810 A1 | 1/2011 | Ooguri et al. | |
| 2011/0055471 A1 | 3/2011 | Thatcher et al. | |
| 2011/0202913 A1* | 8/2011 | Nishimura | 717/178 |
| 2011/0307447 A1 | 12/2011 | Sabaa et al. | |
| 2011/0317699 A1* | 12/2011 | Assarpour | 370/392 |
| 2012/0317353 A1* | 12/2012 | Webman et al. | 711/108 |
| 2013/0238876 A1* | 9/2013 | Fiske et al. | 711/216 |
| 2014/0143364 A1* | 5/2014 | Guerin et al. | 709/212 |

FOREIGN PATENT DOCUMENTS

| | | |
|---|---|---|
| JP | 2009543198 A | 12/2009 |
| JP | 2011028331 A | 2/2011 |
| JP | 2011175421 A | 9/2011 |
| WO | WO2008005211 A2 | 1/2008 |

OTHER PUBLICATIONS

"Cryptographic Hash Function", http://en.wikipedia.org/wiki/Cryptographic_hash_function, retrieved from the internet on Oct. 17, 2012, 6 pages.

"Exar's Hifn Express DR 1600 Series Advanced Data Reduction Cards", HIFN Technology Exar Corporation, hifn.exar.com, 2009, 2 pages.

"Express DX 1700 Series", Exar Corporation, www.exar.com, 2010, 2 pages.

"Express DX 1800 Series", Exar Corporation, www.exar.com, 2011, 2 pages.

"IP over InfiniBand (ipoib)", http://www.ietf.org/wg/concluded/ipoib.html, Last Modified Apr. 14, 2006, retrieved from the internet on Oct. 17, 2012, 3 pages.

"MVAPICH: MPI over InfiniBand, 10GigE/iWARP and RoCe", http://mvapich.cse.ohio-state.edu/, retrieved from the internet on Oct. 17, 2012, 1 page.

"OCTEON® II CN63XX Intelligent Network Adapter Family", Cavium Networks, www.caviumnetworks.com, 2010, 2 pages.

"Sockets Direct Protocol", http://en.wikipedia.org/wiki/Sockets_Direct_Protocol, retrieved from the internet on Oct. 17, 2012, 2 pages.

Magoutis, Kosta "The Optimistic Direct Access File System: Design and Network Interface Support", Workshop on Novel Uses of System Area Network, 2002, http://wmv.hpcaconf.org/hpca8/sites/SAN-1/magoutis.pdf, 12 pages.

* cited by examiner

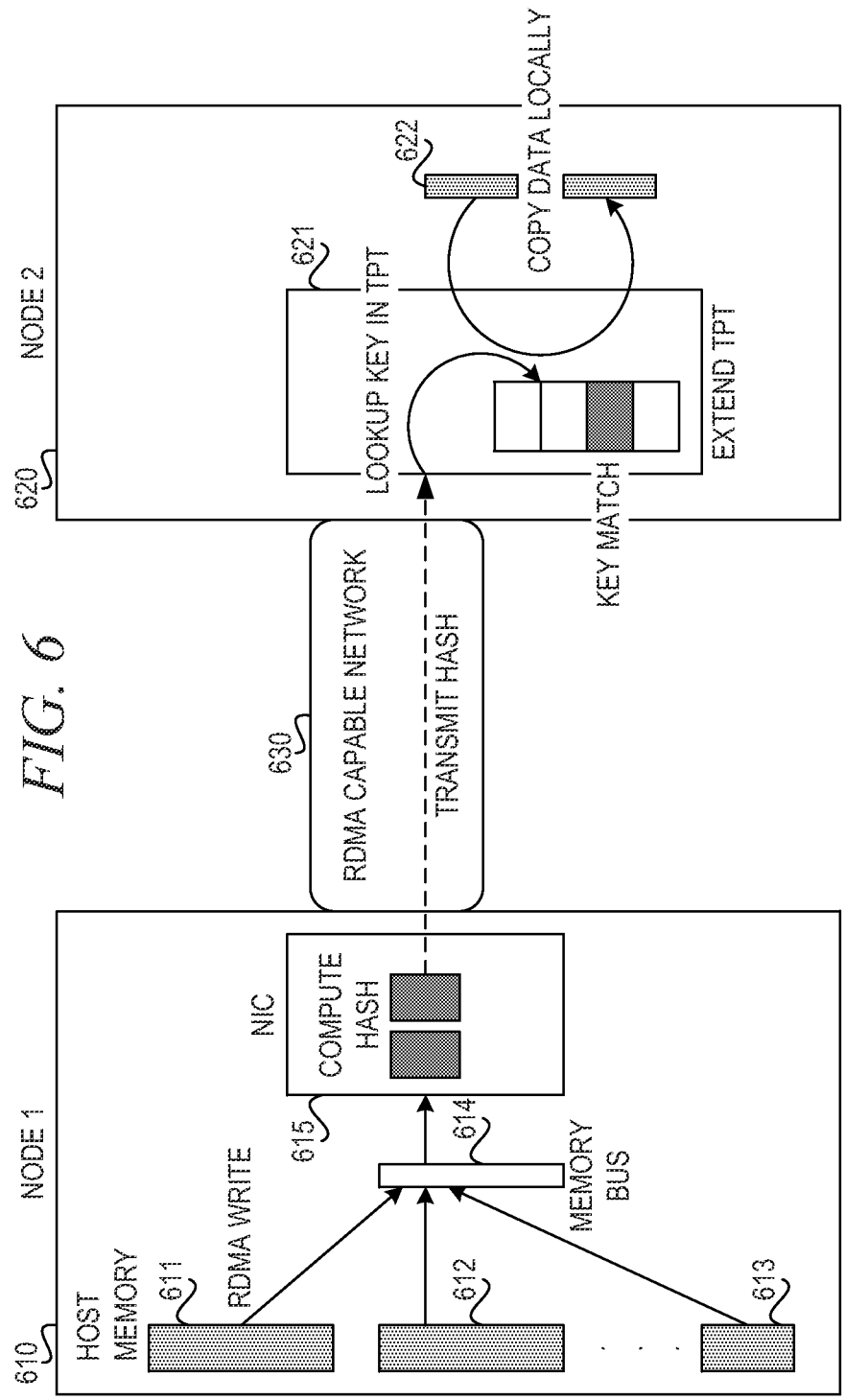

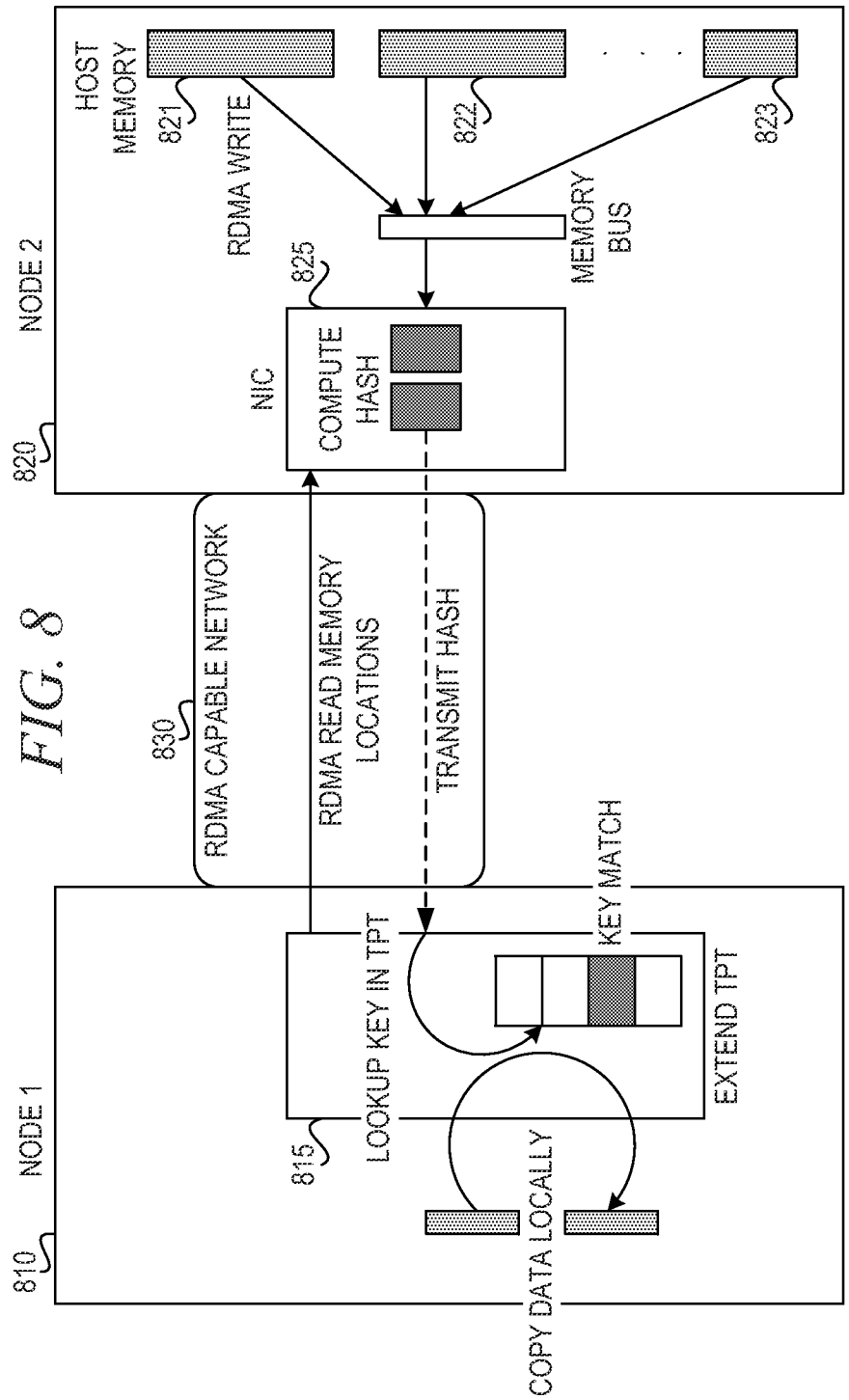

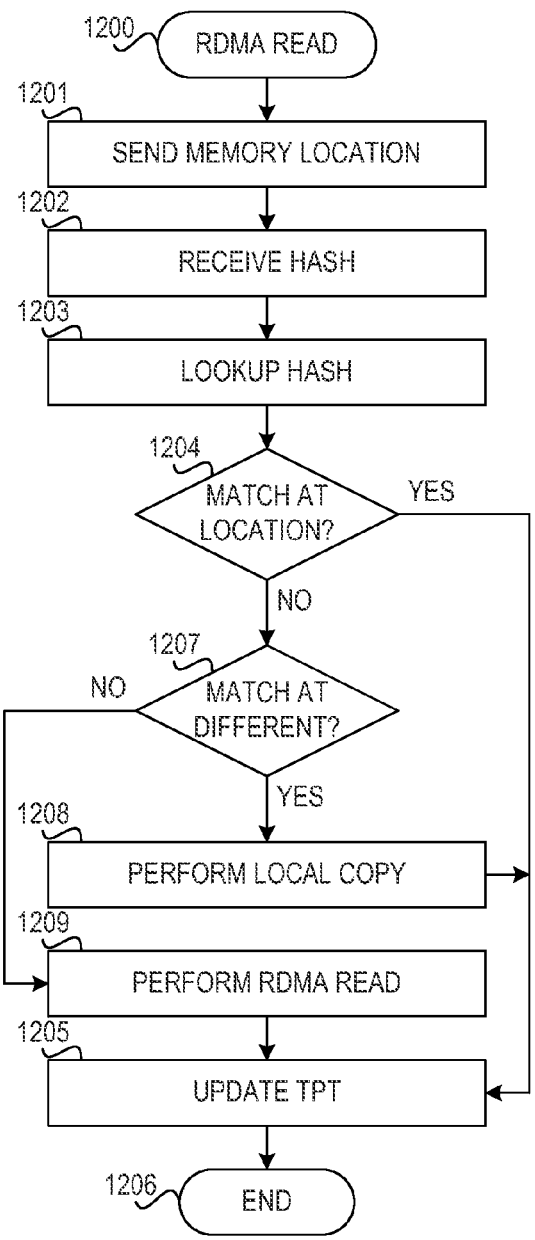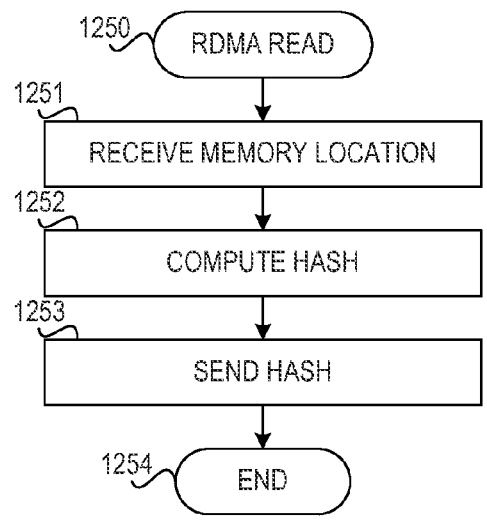

BOOSTING REMOTE DIRECT MEMORY ACCESS PERFORMANCE USING CRYPTOGRAPHIC HASH BASED APPROACH

BACKGROUND

The present application relates generally to an improved data processing apparatus and method and more specifically to mechanisms for boosting remote direct memory access (RDMA) performance using a cryptographic hash based approach.

A cryptographic hash function is a hash function that can be defined as a deterministic procedure that takes an arbitrary block of data and returns a fixed-size bit string, the hash value, such that an accidental or intentional change to the data will change the hash value. The data to be encoded is often called the "message," and the hash value is sometimes called the message digest or simply the digest. The ideal cryptographic function has four main or significant properties: it is easy (but not necessarily quick) to compute the hash value for any given message; it is infeasible to generate a message that has a given hash; it is infeasible to modify a message without changing the hash; and, it is infeasible to find two different messages with the same hash.

Cryptographic hash functions have many information security applications, notably in digital signatures, message authentication codes (MACs), and other forms of authentication. They can also be used as ordinary hash functions, to index data in hash tables, for fingerprinting, to detect duplicate data or uniquely identify files, and as checksums to detect accidental data corruption. Indeed, in information security contexts, cryptographic hash values re sometimes called digital fingerprints, checksums, or just hash values, even though all these terms stand for functions with rather different properties and purposes.

SUMMARY

In one illustrative embodiment, a method, in a data processing system, is provided for performing a remote direct memory access operation. The method comprises responsive to receiving in a network interface controller a hash value of data to be copied from a source address in a source node to a destination address in a destination node in the remote direct memory access operation, performing, by the network interface controller, a lookup operation in a translation protection table in the network interface controller to match the hash value to a hash value for data existing in memory of the destination node. The method further comprises responsive to the network interface controller finding a match in the translation protection table, completing the remote direct memory access operation without transferring the data from the source node to the destination node.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 6 is a block diagram illustrating a mechanism for boosting remote direct memory access (RDMA) performance using a cryptographic hash based approach in accordance with an illustrative embodiment;

FIG. 8 is a block diagram illustrating a mechanism for boosting remote direct memory access (RDMA) read performance using a cryptographic hash based approach in accordance with an illustrative embodiment;

FIG. 12A is a flowchart illustrating operation of an initiator node performing a remote direct memory access (RDMA) read using a cryptographic hash based approach in accordance with an illustrative embodiment; and FIG. 12B is a flowchart illustrating operation of a remote node performing a remote direct memory access (RDMA)

DETAILED DESCRIPTION

The illustrative embodiments provide a mechanism to combine the techniques of remote direct memory access (RDMA) and cryptographic hash into a single communication protocol. The cryptographic hash will be used at key points during the RDMA communication process. It will allow two RDMA enabled network interface controllers (NICs) to substantially reduce the volume of data transmitted or received under certain circumstances. This may provide substantial improvements in medium and large message bandwidth and also potentially considerable reduction in medium and large message latency. This new enhanced protocol will be completely transparent to the end user or application. Any RDMA enabled application will not need any modifications to use the enhanced protocol.

Figure 1:
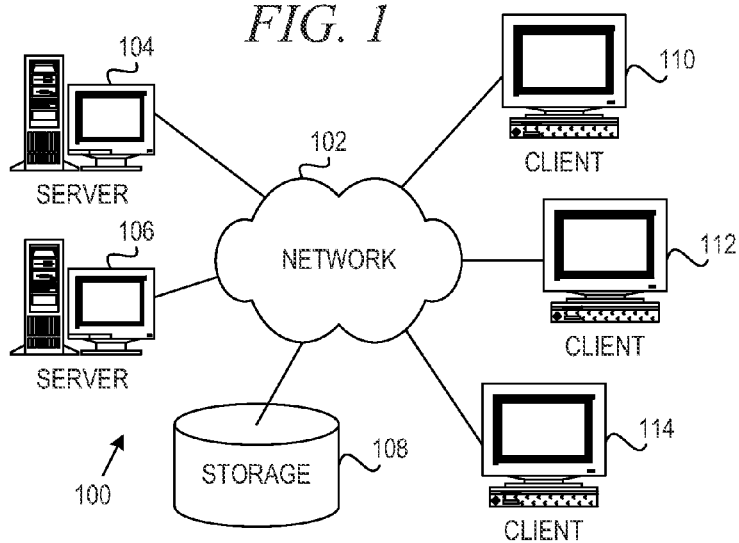
FIG. 1 depicts a pictorial representation of an example distributed data processing system in which aspects of the illustrative embodiments may be implemented.
Figure 2:
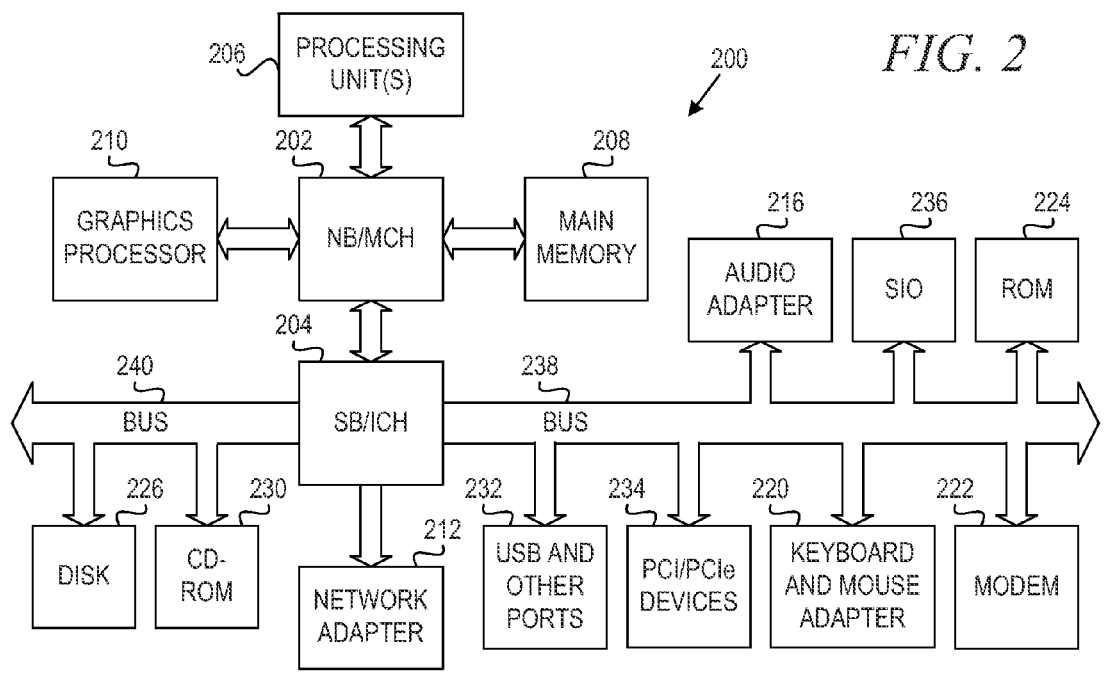
FIG. 2 is a block diagram of an example data processing system in which aspects of the illustrative embodiments may be implemented.

The illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft Windows 7 (Microsoft and Windows are trademarks of Microsoft Corporation in the United States, other countries, or both). An object-oriented programming system, such as the Java programming system, may run in conjunction with the operating system and provides calls to the operating system from Java programs or applications executing on data processing system 200 (Java is a trademark of Oracle and/or its affiliates.).

As a server, data processing system 200 may be, for example, an IBM® eServer™ System P® computer system, running the Advanced Interactive Executive (AIX®) operating system or the LINUX operating system (IBM, eServer, System p, and AIX are trademarks of International Business Machines Corporation in the United States, other countries, or both, and LINUX is a registered trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
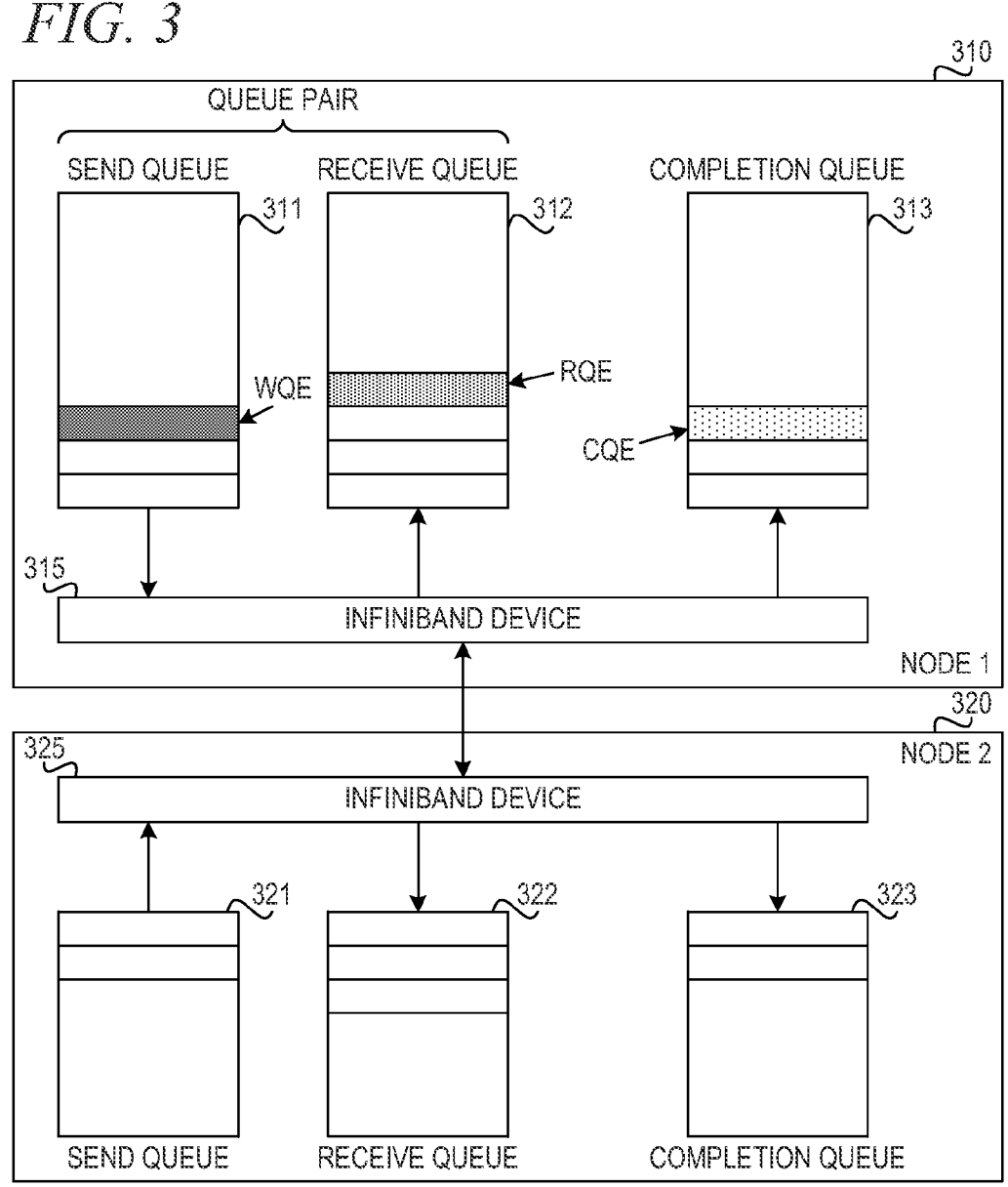
FIG. 3 is a block diagram illustrating an InfiniBand Architecture (IBA) in accordance with an illustrative embodiment.

FIG. 3 is a block diagram illustrating an InfiniBand Architecture (IBA) in accordance with an illustrative embodiment. IBA is an open specification designed for interconnecting compute nodes 310, 320, I/O nodes and devices. In an InfiniBand network, compute nodes 310, 320 are connected to a fabric (not shown) by host channel adapters (HCAs), such as InfiniBand devices 315, 325. InfiniBand allows communication through several combinations of connection-oriented and reliable communication (RC) semantics.

Each node 310, 320 has a send queue (SQ) 311, 321, a receive queue (RQ) 312, 322, and a completion queue (CQ) 313, 323. Communication operations for work queue entries (WQEs) are posted to a work queue. As an example, a WQE is sent from send queue 311 in node 310 to receive queue 322 in node 320. Each SQ and RQ form a queue pair for InfiniBand communications. The completion of these communication operations is signaled by events on the completion queue 313, 323. The sender may either choose to poll the completion queue for completions, block on the completion queue, or opt to receive an interrupt when a completion is detected, by registering a completion handler.

Communication in InfiniBand uses the traditional channel semantics (send/receive operations), as well as memory semantics, such as remote direct memory access (RDMA) operations. Communication buffers must be pinned and then registered with the InfiniBand network interface controller (NIC).

Figure 4:
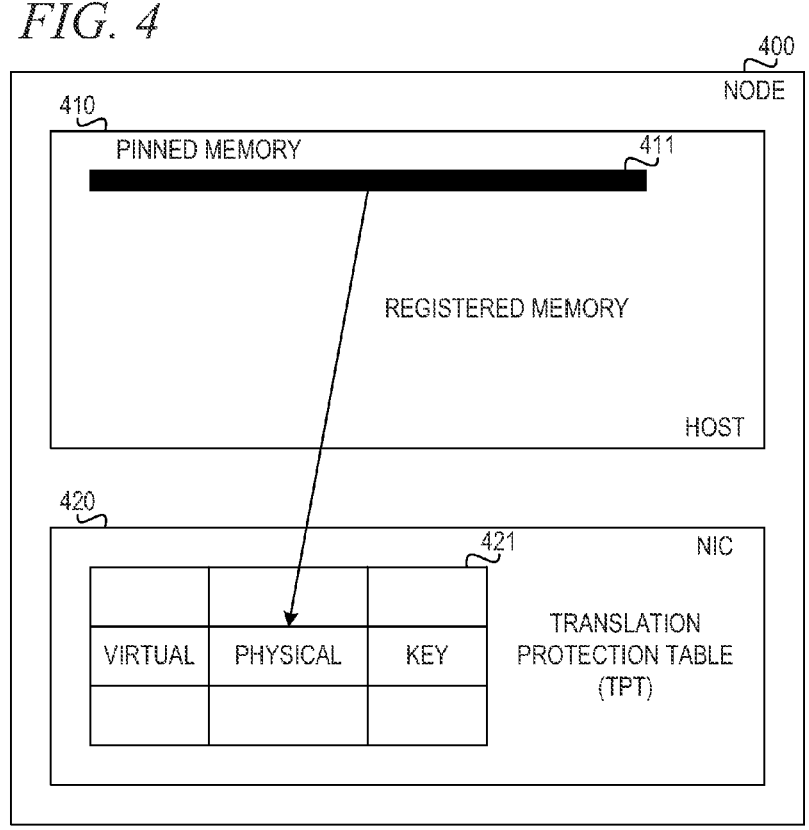
FIG. 4 illustrates address translation of pinned memory buffer in accordance with an illustrative embodiment.

FIG. 4 illustrates address translation of pinned memory buffer in accordance with an illustrative embodiment. Node 400 comprises host 410 and network interface controller (NIC) 420. During registration, the offload NIC stores the virtual address to physical memory address translation of the pinned memory buffer 411 along with an access protection key in its translation and protection table (TPT) 421. The virtual address and protection key may be shared with remote nodes through an out-of-band protocol for later high-performance direct communication without host involvement.

InfiniBand uses the reliable connection (RC) model. In this model, each initiating node must be connected to every other node it wants to communicate with through a peer-to-peer connection, i.e., a queue pair. InfiniBand supports two-sided communication operations called channel semantics, which require active involvement from both the sender and the receiver. One of the peers (receiver) posts an RDMA receive (RV), which is matched to the corresponding RDMA send (RS) from the sending peer.

Figure 5A:
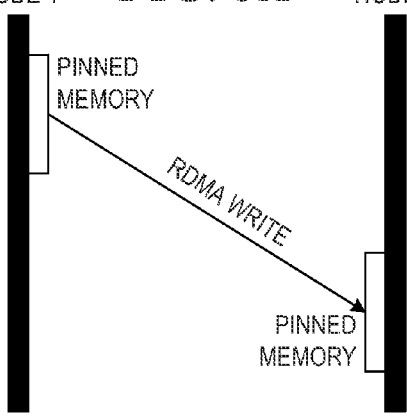
FIG. 5A shows an RDMA write from the pinned memory of one node to the pinned memory of another node in accordance with an illustrative embodiment.

One-sided communication primitives, called semantics, do not require involvement by the receiver. Memory semantic primitives RDMA write (RW) allow one of the peers to directly write into the memory of the other peer. FIG. 5A shows an RDMA write from the pinned memory of one node to the pinned memory of another node in accordance with an illustrative embodiment.

Figure 5B:
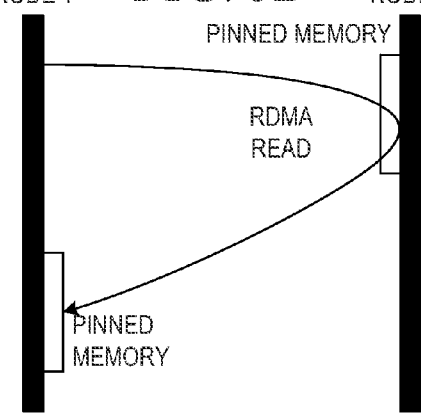
FIG. 5B shows an RDMA read by one node from the pinned memory of another node in accordance with an illustrative embodiment.

An RDMA read (RR) allows one of the peers to directly read remote memory locations. FIG. 5B shows an RDMA read by one node from the pinned memory of another node in accordance with an illustrative embodiment. Other RDMA offload devices, such as 10 Gigabit Ethernet devices, use a similar communication architecture and model. The illustrative embodiments described herein propose changes to the one-sided communication primitives RDMA write and RDMA read.

In one embodiment, a high-performance network, such as the InfiniBand network shown in FIG. 3 or a 10 Gigabit Ethernet network, may provide low latency and high bandwidth. For example, the NIC may have a 4 byte message latency of around 1 microsecond and a bi-directional bandwidth of up to 4 GB/s for large messages. Later generation of offload cards offer higher bandwidth and lower latency. Applicants can also deploy mechanisms like RDMA for zero-copy, low-overhead communication. RDMA operations allow two appropriately authorized peers to read and write data directly from each other's address space. RDMA requires minimal central processor unit (CPU) involvement on the local end and no CPU involvement on the remote end. Designing the stack with RDMA may eliminate the copy overhead inherent in the transfer control protocol (TCP) and user datagram protocol (UDP) stacks and reduce CPU utilization.

In one embodiment, cryptographic hash functions may also be used for limited compression. In this embodiment, the receiver is assumed to have a copy of the data that is desired to be transmitted from sender to receiver, in the form of a "message digest." The sender computes a cryptographic hash of the data it intends to send. The sender transmits the hash to the receiver, which has a hash table with a one-to-one mapping between each received message and its message digest. If the receiver finds a hit, the receiver uses the message digest as the transmitted message. The compression feature arises from the fact that the hash is generally shorter in length than the message to be transmitted.

Cryptographic hash functions may be implemented in software as part of a library. Cryptographic hash functions tend to be computationally expensive, touch every byte in memory of the block to be hashed, and may result in cache pollution and other problems. The cryptographic hash function may be offloaded to devices, such as CPU co-processors or separate cards. Such a card generally sits on a bus, such as a PCI-Express interface, and offer an interface that may be used by an application to offload the hash computation to a particular device.

In accordance with an illustrative embodiment, a mechanism is provided to combine the techniques of RDMA and cryptographic hash into a single communication protocol. The cryptographic hash is used at key points during the RDMA communication process. It allows two RDMA enabled NICs to substantially reduce the volume of data transmitted or received under certain circumstances. This may provide substantial improvements in medium and large message bandwidth and also potentially considerable reduction in medium and large message latency. This new enhanced protocol is completely transparent to the end-user or application, because any RDMA enabled application will not need any modifications to use the enhanced protocol.

FIG. 6 is a block diagram illustrating a mechanism for boosting remote direct memory access (RDMA) write performance using a cryptographic hash based approach in accordance with an illustrative embodiment. Node 1 610 and node 2 620 connect via an RDMA enabled network 630. Nodes 610, 620 have exposed their memory to each other for RDMA operations. An application (not shown) on node 1 610 prepares a scatter/gather list of memory locations 611, 612, 613 that the application intends to transfer via RDMA. The application submits the scatter/gather list to network interface controller (NIC) 615 via memory bus 614.

NIC 615 on node 610 computes a cryptographic hash of the aggregate memory, or looks the hash up in a translation protection table (TPT). NIC 615 transmits the hash keys to the remote NIC 621 on node 2 620. The remote NIC 621 compares the hash keys in parallel to current entries in a TPT. If there is a match, node 1 610 does not transfer the data to node 2 620. If needed, NIC 621 initiates a direct memory access (DMA) operation over the PCI-Express bus from the location in memory 622 of node 2 620 where the data exists to the location where the data is intended to be moved.

If the data are not available, NIC 621 updates the TPT with the protection key, data address, and hash value of the memory location on node 2 620. Node 1 610 then transfers the data to node 2 620 via RDMA through the regular RDMA write mechanism. As can be seen, substantial improvements in bandwidth are possible when the data (or some portion of the data) are already present at the remote node 620.

Figure 7A:
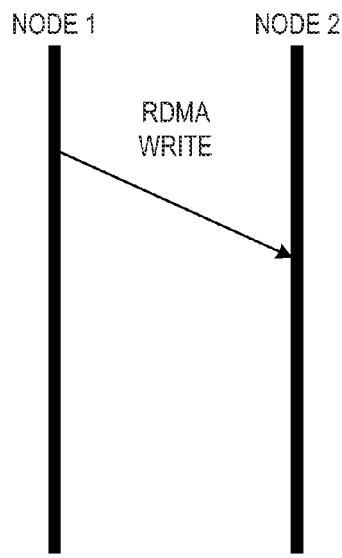
FIGS. 7A-7D show cases for remote direct memory access (RDMA) write using a cryptographic hash based approach in accordance with an illustrative embodiment.

FIGS. 7A-7D show cases for remote direct memory access (RDMA) write using a cryptographic hash based approach in accordance with an illustrative embodiment. FIG. 7A shows a traditional RDMA write operation. Node 1 performs an RDMA write operation sending the data to node 2.

Figure 7B:
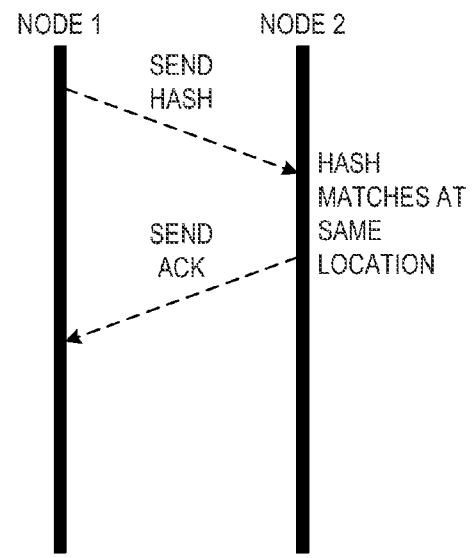

FIG. 7B shows a case where the RDMA operation is optimized using the cryptographic hash. Node 1 transmits the hash value of the data to node 2. The NIC on node 2 looks up the hash key in its TPT. Node 2 finds a match at the exact location where the data is to be placed. No further action is required. Node 2 transmits an acknowledgement (ACK) back to the NIC on node 1, and this completes the protocol for the RDMA write operation according to the illustrative embodiment. Very little network overhead is needed for the transmission of the hash value and the acknowledgement. Both of these messages are very small at the network level and can take advantage of the small message latency of the RDMA enabled network. Substantial savings are possible in this case.

Figure 7C:
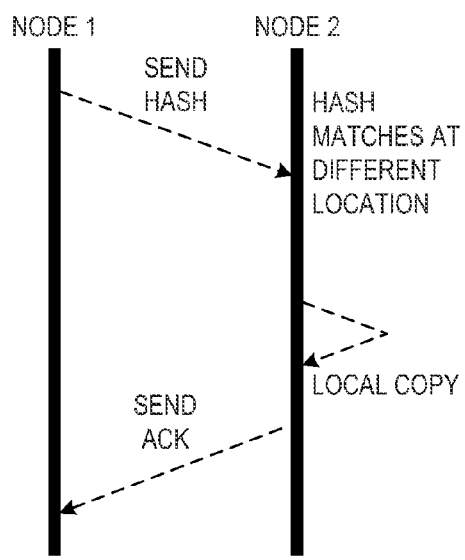

FIG. 7C shows a case of a match of the cryptographic hash at a different location. Node 1 transmits the hash value of the data to node 2. The NIC on node 2 looks up the hash key in its TPT. Node 2 finds a match in the TPT, but at a different memory location than the location where the data is to be placed. In this case, node 2 performs a local copy or DMA transfer to copy the data over to the intended memory location. Node 2 transmits an acknowledgement (ACK) back to the NIC on node 1, and this completes the protocol for the RDMA write operation according to the illustrative embodiment. No network level data transfer is required. A local copy utilizing the bus on node 2 is all that is needed. Because this is a DMA via the I/O bus, cache pollution and other problems are avoided.

Figure 7D:
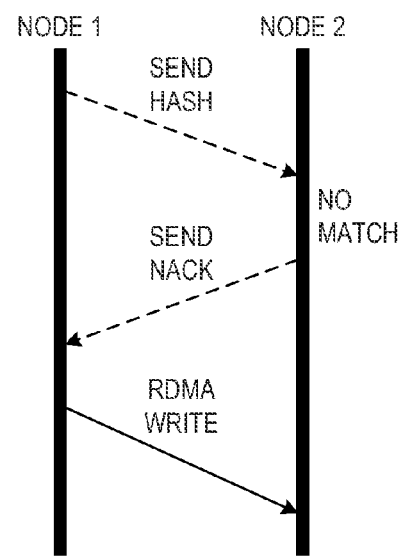

FIG. 7D shows a case of no match of the cryptographic hash. Node 1 transmits the hash value of the data to node 2. The NIC on node 2 looks up the hash key in its TPT but does not find a match in the TPT. Node 2 returns a negative acknowledge (NACK) to node 1, which then transfers the data via the regular RDMA write mechanism.

If the message is large enough, the overhead of the ping-pong control messages may be negligible. Based on experimental evidence, an appropriate threshold may be chosen to decide the size point at which the cryptographic hash has a clear advantage.

FIG. 8 is a block diagram illustrating a mechanism for boosting remote direct memory access (RDMA) read performance using a cryptographic hash based approach in accordance with an illustrative embodiment. Node 1 810 and node 2 820 connect via an RDMA enabled network 830. Nodes 810, 820 have exposed their memory to each other for RDMA operations. An application (not shown) on node 1 810 prepares a scatter/gather list of memory locations on node 1 810 and memory locations 821, 822, 823 on node 2 820 that the application intends to transfer via RDMA read. The application submits the scatter/gather list to network interface controller (NIC) 815. NIC 815 on node 1 810 sends a message with the address of the source buffer to NIC 825 on node 2 820.

The NIC 825 on node 2 620 computes a cryptographic hash of the source memory buffer, e.g., buffer 821, or looks up the cryptographic hash in a TPT. NIC 825 transmits the hash keys to NIC 815 on node 1 810, which compares the hash value in parallel to the current entries in its TPT. If there is a match, the data is not transferred over the network from node 2 820 to node 1 810. If needed, NIC 815 initiates a DMA, over the PCI-Express bus for example, from the location in memory of node 1 810 where the data exists to the location to which the data is intended to be read.

If the data are not available, NIC 815 updates its TPT with the hash value, protection key, and data address on node 1 810. Node 1 810 reads the data from node 2 820 through the regular RDMA read mechanism. As can be seen, substantially improvements in bandwidth are possible when the data (or some portion of the data) are already present at node 1 810.

Figure 9A:
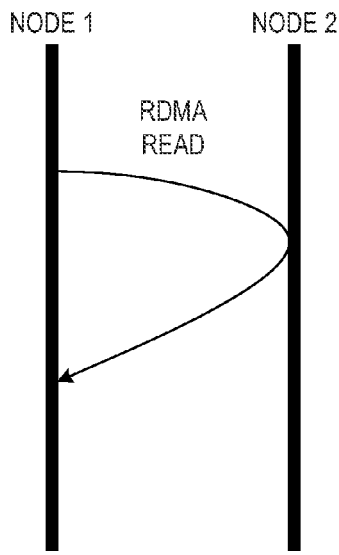
FIGS. 9A-9D show cases for remote direct memory access (RDMA) read using a cryptographic hash based approach in accordance with an illustrative embodiment.

FIGS. 9A-9D show cases for remote direct memory access (RDMA) read using a cryptographic hash based approach in accordance with an illustrative embodiment. FIG. 9A shows a traditional RDMA read operation. Node 1 performs an RDMA read operation to transfer data from the memory of node 2 to the memory of node 1.

Figure 9B:
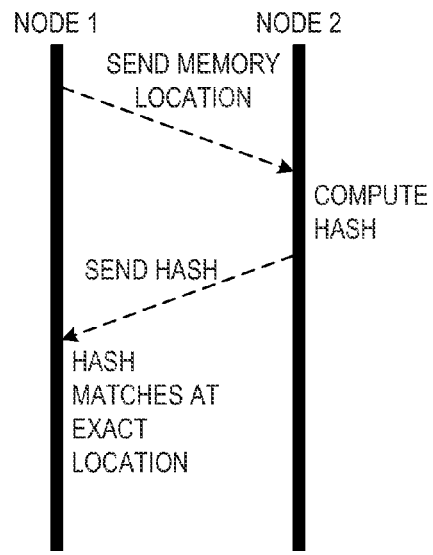

FIG. 9B shows a case of an exact match of the cryptographic hash. Node 1 transmits the source memory address to node 2. The NIC on node 2 computes a hash of the memory location and transmits the hash value of the data to node 1. The NIC on node 1 looks up the hash key in its TPT. Node 1 finds a match at the exact location where the data is to be placed. No further action is required, and this completes the protocol for the RDMA read operation according to the illustrative embodiment. Very little network overhead is needed for the transmission of the hash value. Both of these messages are very small at the network level and can take advantage of the small message latency of the RDMA enabled network. Substantial savings are possible in this case.

Figure 9C:
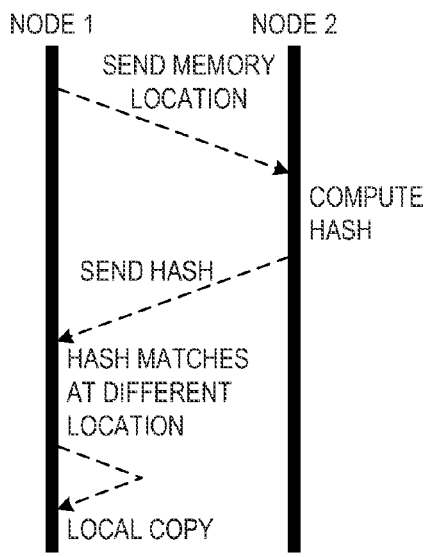

FIG. 9C shows a case of a match of the cryptographic hash at a different location. Node 1 transmits the source memory address to node 2. The NIC on node 2 computes a hash of the memory location and transmits the hash value of the data to node 1. The NIC on node 1 looks up the hash key in its TPT. Node 1 finds a match in the TPT, but at a different memory location than the location where the data is to be placed. In this case, node 1 performs a local copy or DMA transfer to copy the data over to the intended memory location, and this completes the protocol for the RDMA read operation according to the illustrative embodiment. No network level data transfer is required. A local copy utilizing the bus on node 1 is all that is needed. Because this is a DMA via the I/O bus, cache pollution and other problems are avoided.

Figure 9D:
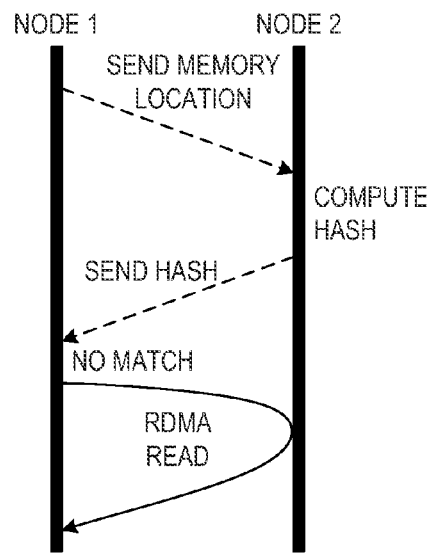

FIG. 9D shows a case of no match of the cryptographic hash. Node 1 transmits the source memory address to node 2. The NIC on node 2 computes a hash of the memory location and transmits the hash value of the data to node 1. The NIC on node 1 looks up the hash key in its TPT but does not find a match in the TPT. Node 1 then transfers the data via the regular RDMA read mechanism.

If the message is large enough, the overhead of the ping-pong control messages may be negligible. Based on experimental evidence, an appropriate threshold may be chosen to decide the size point at which the cryptographic hash has a clear advantage.

Figure 10:
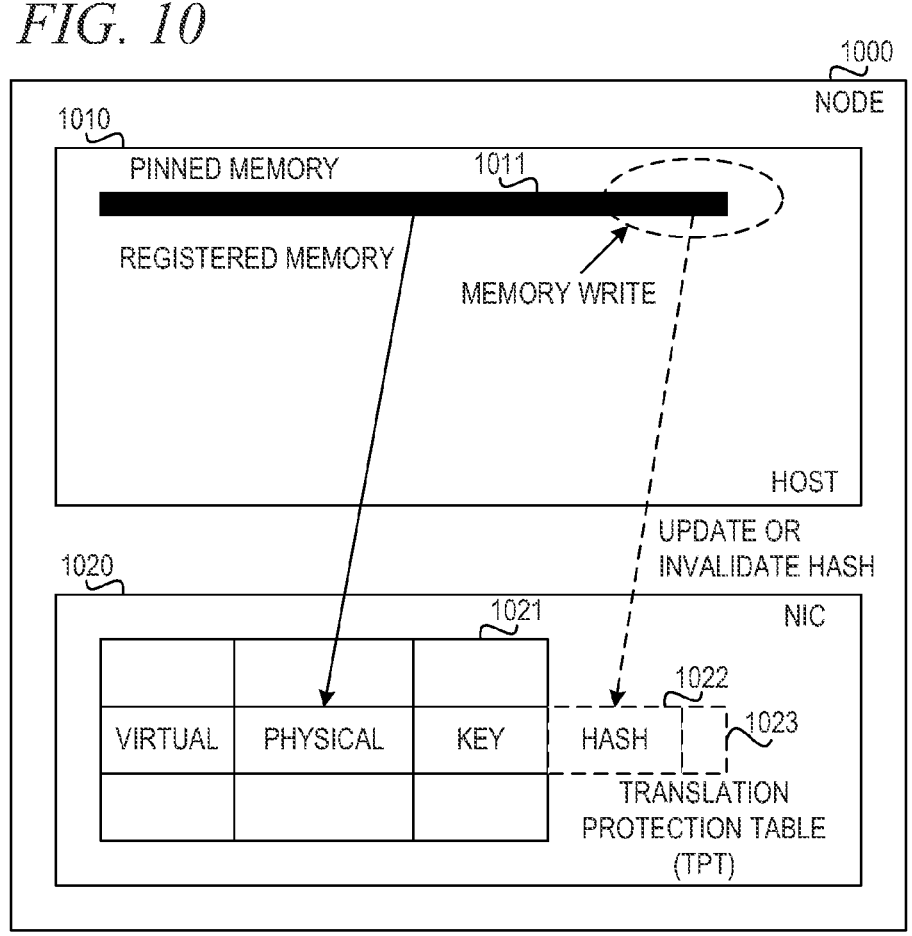
FIG. 10 illustrates changes to the translation protection table on the network interface controller in accordance with an illustrative embodiment.

To implement the mechanisms of the illustrative embodiments, additional fields in the TPT on the NIC and other changes in the communication stack are required. FIG. 10 illustrates changes to the translation protection table on the network interface controller in accordance with an illustrative embodiment. Node 1000 comprises host 1010 and network interface controller (NIC) 1020. During registration, the off-load NIC stores the virtual address to physical memory address translation of the pinned memory buffer 1011 along with an access protection key in its translation and protection table (TPT) 1021. The virtual address and protection key may be shared with remote nodes through an out-of-band protocol for later high-performance direct communication without host involvement.

TPT 1021 includes an additional field 1022 to store the cryptographic hash key value and also a bit 1023 to indicate whether the entry is valid. Further, NIC 1020 comprises a mechanism to invalidate an entry. This is required if there is a change to the memory buffer in the application space. This may be achieved by setting the virtual address or page permissions in the virtual memory or page tables to read-only and then invoking a handler to update the fields when a write exception occurs in the central processing unit (CPU).

Because the TPT usually stores the addresses of physical pages in its translation entries, only the changed pages must be fetched from the other remote side over the network, still resulting in network savings even when the destination buffer differs from the source buffer. The mechanism would then either send a list of hash values for each page of the memory buffer or send a hash value of the memory area in the first message, and then a list of the hash values per page in a follow-up message if the original single hash value does not match. This mechanism may also be used to implement some form of pipelining that may amortize the cost of the additional copy from memory to the NIC to compute the hash before any data transfer may initiate.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 11A:
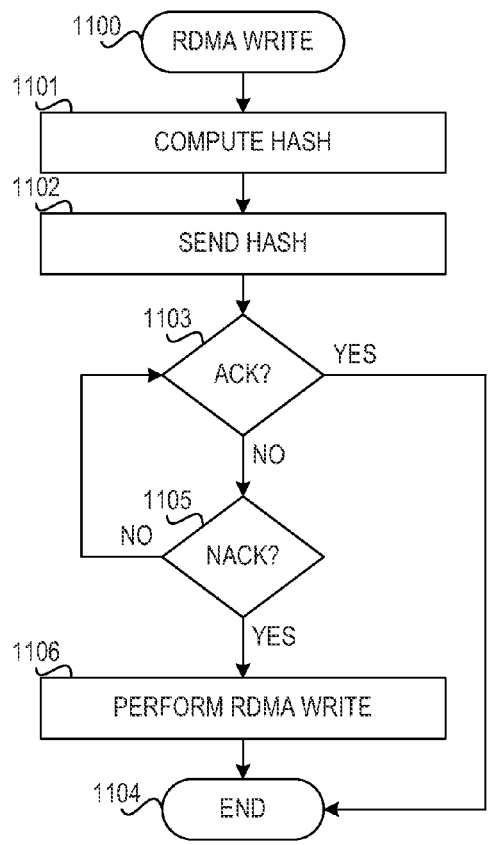
FIG. 11A is a flowchart illustrating operation of an initiator node performing a remote direct memory access (RDMA) write using a cryptographic hash based approach in accordance with an illustrative embodiment.

FIG. 11A is a flowchart illustrating operation of an initiator node performing a remote direct memory access (RDMA) write using a cryptographic hash based approach in accordance with an illustrative embodiment. Operation begins with the initiator node initiating an RDMA write operation (block 1100). The initiator node computes a hash of the data to be written (block 1101) and sends the computed hash value to the remote node (block 1102).

The initiator node determines whether an acknowledgement (ACK) is received from the remote node (block 1103). If the initiator node receives an acknowledgement, then the RDMA write operation completes and operation ends (block 1104).

If the initiator node does not receive an acknowledgement in block 1103, the initiator node determines whether a negative acknowledgement (NACK) is received from the remote node (block 1105). If the initiator node does not receive a negative acknowledgement, operation returns to block 1103 to repeat until the initiator node receives an acknowledgement or a negative acknowledgement. If the initiator node receives a negative acknowledgement in block 1105, the initiator node performs a traditional RDMA write operation to transfer the data to the remote node (block 1106). Thereafter, operation ends (block 1104).

Figure 11B:
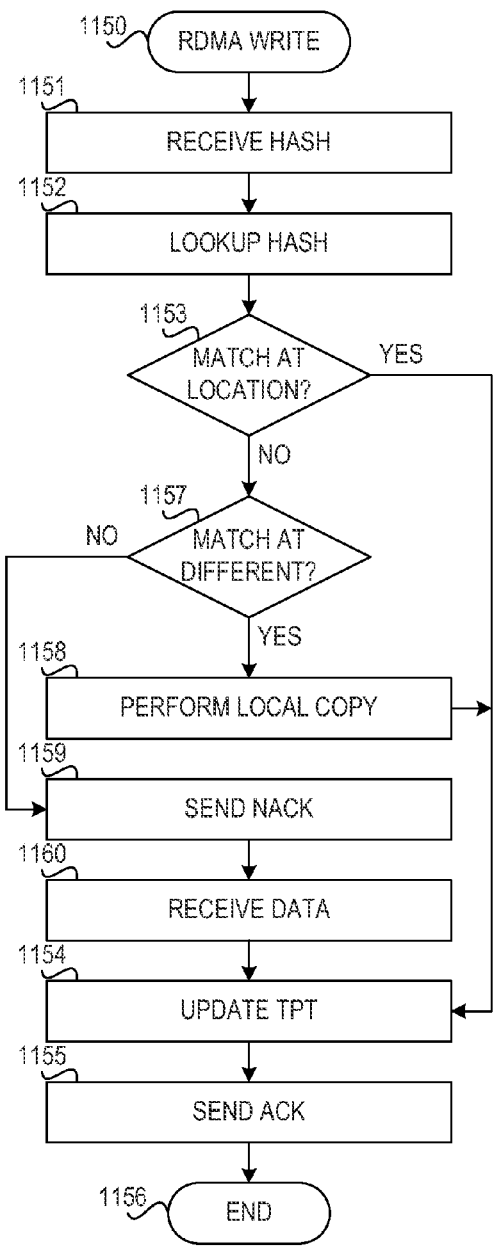
FIG. 11B is a flowchart illustrating operation of a remote node performing a remote direct memory access (RDMA) write using a cryptographic hash based approach in accordance with an illustrative embodiment.

FIG. 11B is a flowchart illustrating operation of a remote node performing a remote direct memory access (RDMA) write using a cryptographic hash based approach in accordance with an illustrative embodiment. Operation begins with the remote node receiving an RDMA write request from an initiator node (block 1150). The remote node then receives a hash value of data to be written (block 1151). The remote node looks up the hash value in the translation protection table (TPT) of the network interface controller (NIC) (block 1152). The remote node determines whether it finds a match at the location to which the data is to be written (block 1153). If the remote node determines the data already exists at the address in block 1153, the remote node updates the TPT with the hash value and valid bit (block 1154) and sends an acknowledgement (ACK) to the initiator node (block 1155). Thereafter, operation ends (block 1156).

If the remote node does not find a match at the address in block 1153, the remote node determines whether it finds a match at a different address (block 1157). If the remote node finds a match at a different address, the remote node performs a local copy of the data to the destination address of the RDMA write operation (block 1158). Then, the remote node updates the TPT with the hash value and valid bit (block 1154) and sends an acknowledgement (ACK) to the initiator node (block 1155). Thereafter, operation ends (block 1156).

If the remote node does not find a match at any address in the TPT in block 1153 or block 1157, the remote node sends a negative acknowledgement (NACK) to the initiator node (block 1159). The remote node receives the data from the initiator node (block 1160). Then, the remote node updates the TPT with the hash value and valid bit (block 1154) and sends an acknowledgement (ACK) to the initiator node (block 1155). Thereafter, operation ends (block 1156).

FIG. 12A is a flowchart illustrating operation of an initiator node performing a remote direct memory access (RDMA) read using a cryptographic hash based approach in accordance with an illustrative embodiment. Operation begins with the initiator node initiating an RDMA read request (block 1200). The initiator node sends a memory location to be read at the remote node (block 1201). The initiator node receives a hash value of the data to be read from the remote node (block 1202).

The initiator node then looks up the hash in its translation protection table (TPT) (block 1203). The initiator node determines whether it finds a match at the read location (block 1204). If the initiator node finds a match at the location, the initiator node updates the TPT with the hash value and valid bit (block 1205), and operation ends (block 1206).

If the initiator node does not find a match at the read location in block 1204, the initiator node determines whether it finds a match at a different memory address in the TPT (block 1207). If the initiator node finds a match at a different address in the TPT, the initiator node performs a local copy of the data to the destination address of the RDMA write operation (block 1208). Then, the initiator node updates the TPT with the hash value and valid bit (block 1205), and operation ends (block 1206).

If the initiator node does not find a match at any address in the TPT in block 1204 or block 1207, the initiator reads the data from the remote node using a traditional RDMA read operation (block 1209). Then, the initiator node updates the TPT with the hash value and valid bit (block 1205), and operation ends (block 1206).

FIG. 12B is a flowchart illustrating operation of a remote node performing a remote direct memory access (RDMA) read using a cryptographic hash based approach in accordance with an illustrative embodiment. Operation begins with the remote node receiving an RDMA read request from an initiator node (block 1250). The remote node then receives a memory location for the RDMA read (block 1251). The remote node computes a hash of the data at the memory location (block 1252) and sends the hash value to the initiator node (block 1253). Thereafter, operation ends (block 1254).

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for boosting remote direct memory access (RDMA) performance using a cryptographic hash based approach. The mechanisms combine the techniques of RDMA and cryptographic hash into a single communication protocol. The cryptographic hash is used at key points during the RDMA communication process. The mechanisms allow two RDMA enabled network interface controllers (NICs) to substantially reduce the volume of data transmitted or received under certain circumstances. This may provide substantial improvements in medium and large message bandwidth and also potentially considerable reduction in medium and large message latency. This new enhanced protocol will be completely transparent to the end user or application. Any RDMA enabled application will not need any modifications to use the enhanced protocol.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for performing a remote direct memory access operation, the method comprising:

responsive to receiving in a network interface controller a hash value of data to be copied from a source address in a source node to a destination address in a destination node in the remote direct memory access operation, performing, by the network interface controller, a lookup operation in a translation protection table in the network interface controller to match the hash value to a hash value for data existing in memory of the destination node;

responsive to the network interface controller finding a match in the translation protection table, completing the remote direct memory access operation without transferring the data from the source node to the destination node; and responsive to the network interface controller finding a match at a given memory location that is different from the destination address, performing a local copy operation to copy the data from the given memory location to the destination memory location.

2. The method of claim 1, further comprising:

responsive to the network interface controller finding a match in the translation protection table, updating, by the network interface controller, the translation protection table to write a protection key, the hash value, and a valid/invalid bit in association with the destination address.

3. The method of claim 1, wherein the remote direct memory access operation is a remote direct memory access write operation, the method further comprising:

responsive to the network interface controller finding a match in the translation protection table, sending, by the network interface controller, an acknowledgement message to the source node.

4. The method of claim 3, the method further comprising:

responsive to the network interface controller not finding a match, sending, by the network interface controller, a negative acknowledgement message.

5. The method of claim 4, wherein responsive to receiving the negative acknowledgement message, the source node performs a traditional remote direct memory access write operation.

6. The method of claim 3, wherein the source node computes a hash value of data to be copied from the source address at the source node to the destination address at the destination node and wherein the source node sends the computed hash value to the network interface controller.

7. The method of claim 1, wherein the remote direct memory access operation is a remote direct memory access read operation, the method further comprising:

sending, by the network interface controller, the source address to the source node in association with the remote direct memory access read operation; and receiving, by the network interface controller, the hash value from the source node, wherein source node computes a hash value of data to be copied from the source address at the source node to the destination address at the destination node and wherein the source node sends the computed hash value to the network interface controller in response to receiving the source address from the destination node.

8. A computer program product comprising a non-transitory computer readable medium having a computer readable program stored therein, wherein the computer readable program, when executed on a network interface controller, causes the network interface controller to:

responsive to receiving in the network interface controller a hash value of data to be copied from a source address in a source node to a destination address in a destination node in the remote direct memory access operation, perform a lookup operation in a translation protection table in the network interface controller to match the hash value to a hash value for data existing in memory of the destination node;

responsive to the network interface controller finding a match in the translation protection table, complete the remote direct memory access operation without transferring the data from the source node to the destination node; and responsive to the network interface controller finding a match at a given memory location that is different from the destination address, perform a local copy operation to copy the data from the given memory location to the destination memory location.

9. The computer program product of claim 8, wherein the computer readable program further causes the network interface controller to:

responsive to the network interface controller finding a match in the translation protection table, update the translation protection table to write a protection key, the hash value, and a valid/invalid bit in association with the destination address.

10. The computer program product of claim 8, wherein the remote direct memory access operation is a remote direct memory access write operation, wherein the computer readable program further causes the network interface controller to:

responsive to the network interface controller finding a match in the translation protection table, send an acknowledgement message to the source node.

11. The computer program product of claim 10, wherein the computer readable program further causes the network interface controller to:

responsive to the network interface controller not finding a match, send a negative acknowledgement message.

12. The computer program product of claim 8, wherein the remote direct memory access operation is a remote direct memory access read operation, wherein the computer readable program further causes the network interface controller to:

send, by the network interface controller, the source address to the source node in association with the remote direct memory access read operation; and receive the hash value from the source node, wherein source node computes a hash value of data to be copied from the source address at the source node to the destination address at the destination node and wherein the source node sends the computed hash value to the network interface controller in response to receiving the source address from the destination node.

13. The computer program product of claim 8, wherein the computer readable program is stored in a computer readable storage medium in a data processing system and wherein the computer readable program was downloaded over a network from a remote data processing system.

14. The computer program product of claim 8, wherein the computer readable program is stored in a computer readable storage medium in a server data processing system and wherein the computer readable program is downloaded over a network to a remote data processing system for use in a computer readable storage medium with the remote system.

15. An apparatus, comprising:

a network interface controller comprising a translation protection table; and a computer readable storage medium having a computer readable program stored therein, wherein the computer readable program, when executed by the network interface controller, causes the network interface controller to:

responsive to receiving in the network interface controller a hash value of data to be copied from a source address in a source node to a destination address in a destination node in the remote direct memory access operation, perform a lookup operation in a translation protection table in the network interface controller to match the hash value to a hash value for data existing in memory of the destination node;

responsive to the network interface controller finding a match in the translation protection table, complete the remote direct memory access operation without transferring the data from the source node to the destination node;

responsive to the network interface controller finding a match at a given memory location that is different from the destination address, perform a local copy operation to copy the data from the given memory location to the destination memory location.

16. The apparatus of claim 15, wherein the computer readable program further causes the network interface controller to:

responsive to the network interface controller finding a match in the translation protection table, update the translation protection table to write a protection key, the hash value, and a valid/invalid bit in association with the destination address.

17. The apparatus of claim 15, wherein the remote direct memory access operation is a remote direct memory access write operation, wherein the computer readable program further causes the network interface controller to:

responsive to the network interface controller finding a match in the translation protection table, send an acknowledgement message to the source node.

18. The apparatus of claim 17, wherein the computer readable program further causes the network interface controller to:

responsive to the network interface controller not finding a match, send a negative acknowledgement message.

19. The apparatus of claim 15, wherein the remote direct memory access operation is a remote direct memory access read operation, wherein the computer readable program further causes the network interface controller to:

send, by the network interface controller, the source address to the source node in association with the remote direct memory access read operation; and receive the hash value from the source node, wherein source node computes a hash value of data to be copied from the source address at the source node to the destination address at the destination node and wherein the source node sends the computed hash value to the network interface controller in response to receiving the source address from the destination node.

20. The computer program product of claim 11, wherein responsive to receiving the negative acknowledgement message, the source node performs a traditional remote direct memory access write operation.

21. The computer program product of claim 10, wherein the source node computes a hash value of data to be copied from the source address at the source node to the destination address at the destination node and wherein the source node sends the computed hash value to the network interface controller.

22. The apparatus of claim 18, wherein responsive to receiving the negative acknowledgement message, the source node performs a traditional remote direct memory access write operation.

* * * * *